United States Patent
Huh

(10) Patent No.: US 6,938,210 B1
(45) Date of Patent: Aug. 30, 2005

(54) COMPUTER-BASED LECTURE RECORDING AND REPRODUCING METHOD

(75) Inventor: Seon Huh, Seoul (KR)

(73) Assignee: Liztech Co., Ltd., (KR)

( * ) Notice: Subject to any disclaimer, the term of this patent is extended or adjusted under 35 U.S.C. 154(b) by 385 days.

(21) Appl. No.: 09/829,879

(22) Filed: Apr. 10, 2001

(30) Foreign Application Priority Data

Apr. 11, 2000 (KR) ................................ 2000-18980

(51) Int. Cl.[7] ........................................... G06F 17/50
(52) U.S. Cl. ..................................... 715/730; 715/732
(58) Field of Search ........................... 345/709, 700, 345/730, 732, 859

(56) References Cited

U.S. PATENT DOCUMENTS

| | | | | |
|---|---|---|---|---|
| 5,412,775 | A * | 5/1995 | Maeda et al. | 345/797 |
| 5,767,897 | A * | 6/1998 | Howell | 348/14.07 |
| 6,188,831 | B1 * | 2/2001 | Ichimura | 386/69 |
| 6,509,909 | B1 * | 1/2003 | Nelson et al. | 345/732 |
| 6,580,438 | B1 * | 6/2003 | Ichimura et al. | 345/732 |

* cited by examiner

Primary Examiner—John Cabeca
Assistant Examiner—Dennis G. Bonshock
(74) Attorney, Agent, or Firm—Cantor Colburn LLP

(57) ABSTRACT

A computer-based lecture recording and reproducing method includes: executing a lecture recording and reproducing pragram; recording the lecture, including: storing information from an information inputting unit and information relating to the input information in a memory, with time information and storing voice information in the memory; writing pre-stored information in a lecture file and the input information on an assigned area in the memory, with a graphic tool by using the pre-stored information and the relating information so as to be equal to a configuration displayed on a screen; and displaying the written information on the screen; and reproducing the lecture, including: storing the lecture file information and the related information in the memory; writing the lecture file information on the assigned area in the memory, with the graphic tool by using the related information; and displaying the written information on the screen and outputting the voice information.

12 Claims, 14 Drawing Sheets

FIG.3

| Edit (E) | |
|---|---|
| Undo a drawing execution (U) | Ctrl+Z |
| Undo a whole drawing (E) | |
| Delete an image (D) | Del |
| Delete all image (A) | Shift+Del |
| Copy a selected region (t) | Ctrl+C |
| Paste (P) | Ctrl+V |

FIG. 8

| Header | DATE AND TIME INFORMATION |
| --- | --- |
| | VERSION INFORMATION |
| | RECOGNIZER |
| | COMMENT |
| | START LOCATION OF A HANDWRITING INFORMATION |
| | SIZE OF A HANDWRITING INFORMATION(DATA AMOUNT) |
| | START LOCATION OF A DRAWING INFORMATION (A LINE, LETTER, A FIGURE, ETC) |
| | SIZE OF A DRAWING INFORMATION(DATA AMOUNT) |
| | START LOCATION OF A LECTURE PLAN/SCHEDULE (AN IMAGE, A CLIP ART, A METAFILE, ETC) INFORMATION |
| | SIZE OF A LECTURE PLAN/SCHEDULE(DATA AMOUNT) |
| | START LOCATION OF A VOICE INFORMATION |
| | SIZE OF A VOICE INFORMATION(DATA AMOUNT) |
| | RESOLUTION INFORMATION |
| | RESERVED REGION |
| HANDWRITING INFORMATION | ACTUAL HANDWRITING INFORMATION AND ITS RELATED INFORMATION |
| DRAWING INFORMATION | ACTUAL DRAWING INFORMATION AND ITS RELATED INFORMATION |
| LECTURE PLAN/ SCHEDULE INFORMATION | ACTUAL LECTURE PLAN/SCHEDULE INFORMATION AND ITS RELATED INFORMATION |
| VOICE INFORMATION | ACTUAL VOICE INFORMATION AND ITS RELATED INFORMATION |

FIG.9

| THE TOTAL NUMBER |
|---|
| PEN THICKNESS |
| PEN COLOR |
| STARTING TIME |
| ENDING TIME |
| TOOL (PEN OR ERASER) |
| BACKGROUND COLOR INFORMATION |
| THE TOTAL POINT NUMBER |
| RESERVED REGION |
| NEXT RECORD POINTER |
| PREVIOUS RECORD POINTER |

FIG.12

| REGION INFORMATION |
| --- |
| OBJECT ID |
| COLOR |
| PREVIOUS COLOR |
| THICKNESS |
| THE TOTAL POINT NUMBER |
| LAYER INFORMATION |
| POINTER |

FIG. 14

| LOCATION INFORMATION |
|---|
| ACTUAL SIZE OF A LECTURE PLAN/SCHEDULE |
| SIZE OF A LECTURE PLAN/SCHEDULE |
| TYPE |
| LOCATION INFORMATION IN THE LECTURE FILE |
| LECTURE PLAN/SCHEDULE INFORMAION |
| FILE SIZE OF A LECTURE PLAN/SCHEDULE |
| STARTING TIME |
| ENDING TIME |
| RESERVED REGION |

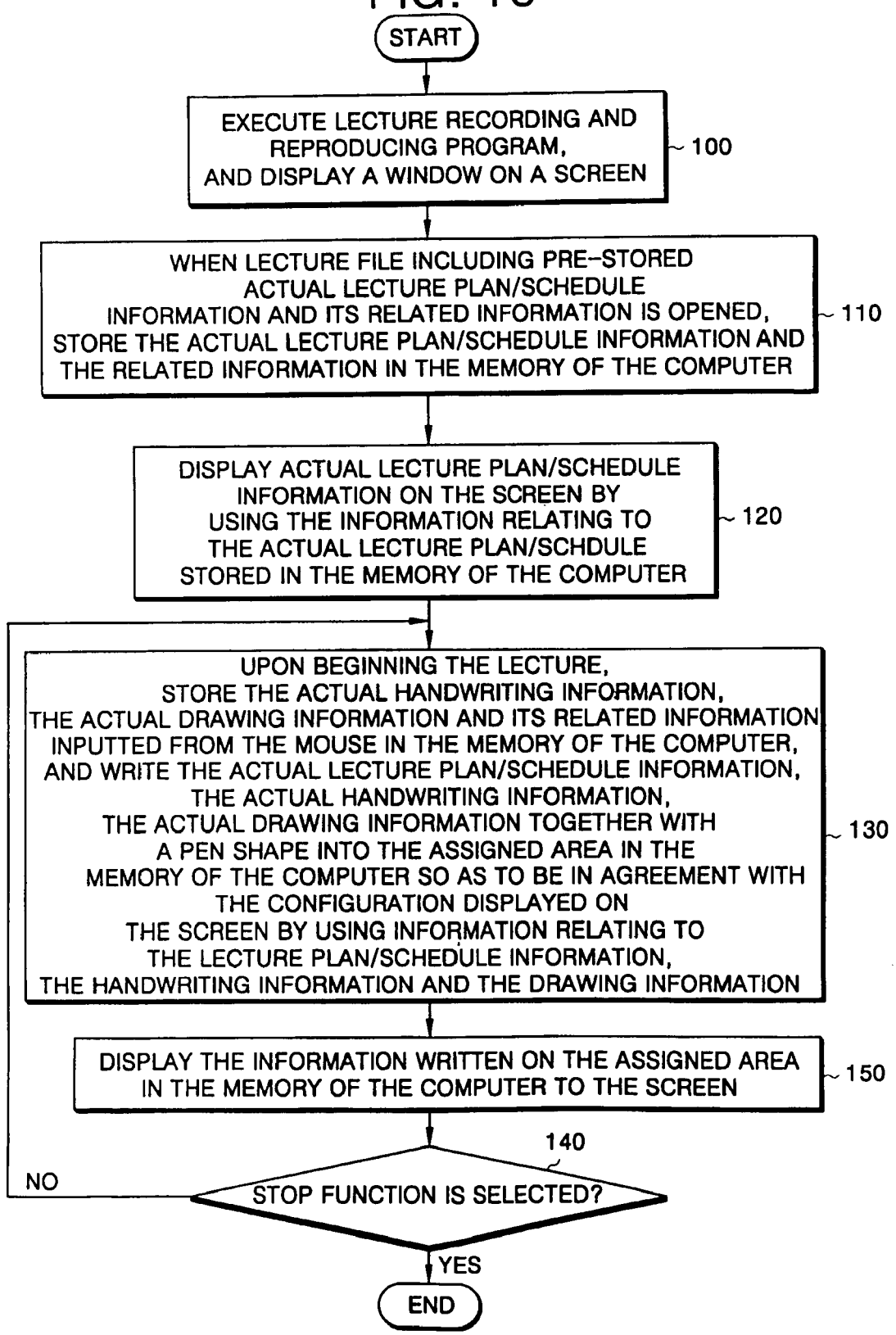

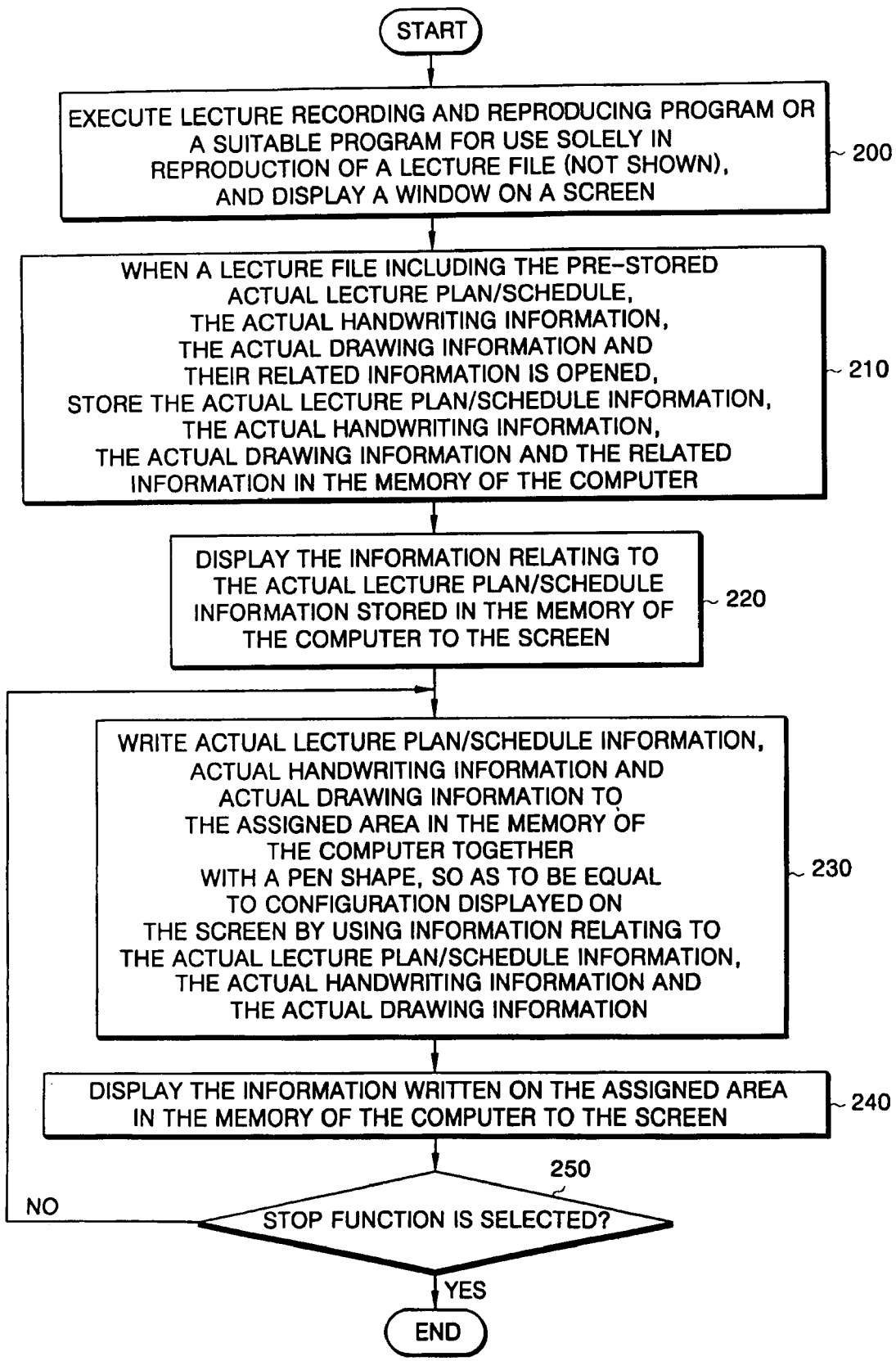

COMPUTER-BASED LECTURE RECORDING AND REPRODUCING METHOD

CROSS REFERENCE

This application claims the benefit of Korean Patent Application No. 2000-18980, filed on Apr. 11, 2000, under 35 U.S.C. § 119, the entirety of which is hereby incorporated by reference.

BACKGROUND OF THE INVENTION

1. Field of the Invention

The present invention relates to a computer-based lecture recording and reproducing method.

2. Description of Related Art

A lecture recording and reproducing program should be able to provide various functions that a lecturer desires and display handwriting information written by a lecturer during a lecture on a screen without a flicker. That is, handwriting information written by a lecturer during a lecture should be able to be properly inputted to be displayed on a screen without any display tremble and should have not any display tremble while students reproduce a lecture file to take part in a lecture. However, a conventional computer-based lecture recording and reproducing program can not exactly display handwriting information written by a lecturer during a lecture on a screen due to a flicker. Also, there is a problem that graphic tools as well as handwriting information written by a lecturer during a lecture are displayed on a screen with a display tremble.

For the foregoing reason, there is a need for a lecture recording and reproducing program and method that can display handwriting information on a screen together with graphic tool without a flicker.

SUMMARY OF THE INVENTION

To overcome the problems described above, preferred embodiments of the present invention provide a computer-based lecture recording and reproducing method that can display handwriting information on a screen together with graphic tool without a flicker.

In order to achieve the above object, the preferred embodiments of the present invention provide a computer-based lecture recording and reproducing method using a computer, in which the computer includes an information inputting unit for inputting handwriting information during a lecture, a voice inputting unit for inputting voice information during the lecture, a voice outputting unit for outputting the reproduced voice information, and a lecture recording and reproducing program for recording information inputted from the information inputting unit and the voice inputting unit and for reproducing the recorded information, the method comprising: executing the lecture recording and reproducing program to display a window on a screen; recording the lecture, including: storing information inputted from the information inputting unit and information relating to the information inputted from the information inputting unit in a memory of the computer together with time information and storing voice information inputted from the voice inputting unit in the memory of the computer; writing pre-stored information in a lecture file and the information inputted from the information inputting unit on an assigned area in the memory of the computer together with a shape of graphic tool by using the pre-stored information relating to the lecture file in the memory of the computer and the information relating to the information inputted from the information inputting unit so as to be equal to a configuration displayed on the screen; and displaying information written on the assigned area in the memory of the computer on the window of the screen; and reproducing the recorded lecture, including: storing information of the lecture file and the related information in the memory of the computer; writing sequentially the information of the lecture file on the assigned area in the memory of the computer together with the shape of graphic tool by using the related information; and displaying the information written on the assigned area in the memory of the computer on the window of the screen and outputting the voice information through the voice outputting unit.

The graphic tool is displayed in a pen shape when the handwriting information is inputted, and is displayed in an eraser shape when the inputted handwriting information is removed. The information of the lecture file is lecture plan/schedule information presented for the lecture in advance. The lecture plan/schedule information includes information captured from a screen. The lecture plan/schedule information includes a graphic image file. The information of the lecture file includes a lecture plan/schedule information, a handwriting information and a drawing information. The drawing information and the lecture plan/schedule information are stored before the recording or when the recording is momentarily paused. The information relating to the information of the lecture file includes date and time information, version information, recognizer, comments, start location of the handwriting information, size of the handwriting information, start location of the drawing information, size of the drawing information, start location of the lecture plan/schedule information, size of the lecture plan/schedule information, start location of voice information, size of the voice information, resolution information, information relating to the lecture plan/schedule information, information relating to the handwriting information, and information relating to the drawing information. The information relating to the stroke information includes a stroke record and a point record, the stroke record including a total number of strokes, a pen thickness, a pen color, a start time of each stroke, an end time of each stroke, a kind of tool, background color information, a total number of points produced in the strokes, and point information indicating a previous stroke and a next stroke, the point record including a time when a point is produced, point location information, event information generated during recording the lecture, and point information indicating a previous point and a next point. The information relating to the drawing information comprises types of drawing objects a color of the object, a type of used pen, a thickness of the used pen, a brush style, location information and a layer information, a free line object of the drawing objects including region information having a start point and an end point of the free line, an object ID, a color used when the object is drawn, a color before the object is drawn, a pen thickness of the free line, a total number of points, layer information, location information on a first point, a letter object of the drawing objects including location information on a character string to be displayed, region information, font information, a size, a color, a background color, a background mode, layer information, character string information to be actually displayed. The lecture plan/schedule information region stores a location for the lecture plan/schedule to be displayed, an actual size of the lecture plan/schedule, a type of the lecture plan/schedule, start location information of respective images in the lecture file when at least one lecture plan/ schedule is used, the lecture plan/schedule information, size information of the lecture plan/schedule file, a starting time for the lecture plan/schedule to be displayed, a time when the lecture plan/schedule is deleted. The stroke record is produced whenever an up or a down event occurs by the information inputting unit. The point record stores location information and time information according to the movement of the information inputting unit after the stroke record is generated. The lecture recording and reproducing program sets the system timer and reproduces information of the lecture file using the time information according to the system timer in the step of reproducing the recorded lecture.

The present invention provides a method of reproducing a lecture by using a computer, in which the computer includes a voice outputting unit for outputting a reproduced voice information and a lecture reproducing program for reproducing a recorded lecture file, the method comprising: executing the lecture reproducing program to display an initial screen window; storing information of a lecture file, information relating to the information of the lecture file, time information and voice information in a memory of the computer; writing sequentially the information of the lecture file on an assigned area in the memory of the computer together with a shape of graphic tool by using the information relating to the information of the lecture file so as to be equal to a configuration displayed on the screen; and displaying information written on the assigned area in the memory of the computer on a window of the screen and outputting voice information through the voice outputting unit.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which:

FIG. 3 shows a configuration of a menu "edit" of the menu bar of FIG. 1;

FIG. 8 shows a structure of a lecture file stored by a lecture recording and reproducing method of the present invention;

FIG. 9 shows a structure of a stroke record of handwriting information region of the lecture file according to the preferred embodiment of the present invention;

FIG. 12 shows a structure of a free line object portion of the drawing information region of the lecture file;

FIG. 14 shows image information of the lecture file;

FIG. 15 is a flow chart illustrating a method of recording a lecture according to an exemplary embodiment of the present invention; and FIG. 16 is a flow chart illustrating a method of reproducing a lecture according to an exemplary embodiment of the present invention.

DETAILED DESCRIPTION OF THE INVENTION

Reference will now be made in detail to exemplary embodiments of the present invention, examples of which are illustrated in the accompanying drawings.

Figure 1:
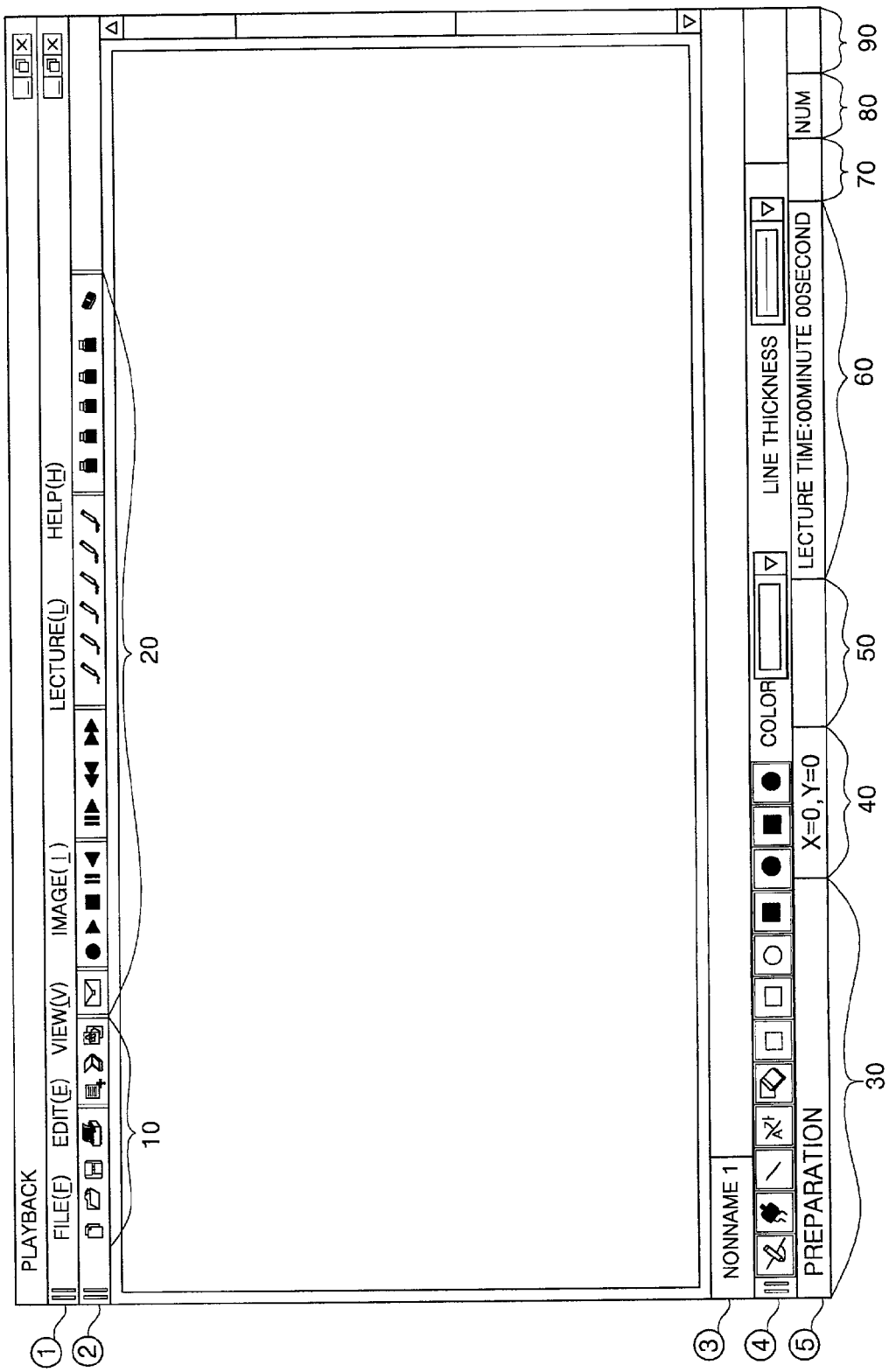
FIG. 1 shows an initial screen of a lecture recording and reproducing program according to an exemplary embodiment of the present invention.

FIG. 1 shows an initial screen of a lecture recording and reproducing program according to an exemplary embodiment of the present invention. As shown in FIG. 1, the initial screen includes a menu bar 1, tool bars 2 and 4, a file list 3, and an application bar 5. The menu bar 1 includes menus such as "file", "edit", "view", "image", "lecture". The tool bar includes a basic tool bar 2 and a draw tool bar 4. The file list 3 includes a file name that is now opened. The status bar 5 indicates a help information of respective menus and tools, information such as a present location of a mouse, a reproduction time, a lecture recording time, etc, and an information regarding a keyboard set state such as "Num Lock", "Caps Lock", etc.

Figure 2:
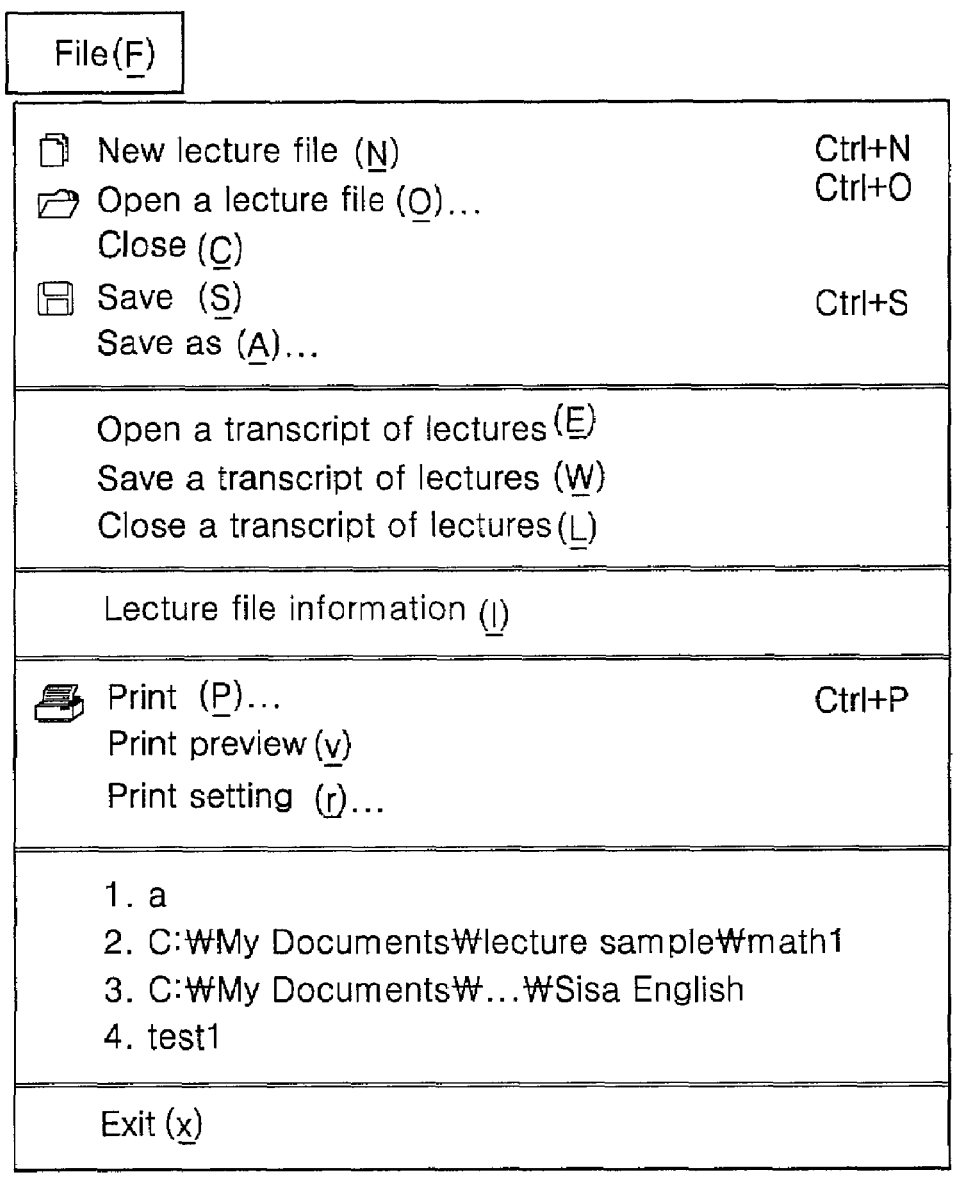
FIG. 2 shows a configuration of a menu "file" of the menu bar of FIG. 1.

FIG. 2 shows a configuration of the menu "file" of the menu bar of FIG. 1. As shown in FIG. 2, the menu "file" includes menus such as "new lecture file", "open a lecture file", "close", "save as", "open a transcript of lectures", "save a transcript of lectures", "close a transcript of lectures", "lecture file information", "print", "print preview", "print setting", "a list of the latest files", "exit", etc.

FIG. 3 shows a configuration of the menu "edit" of the menu bar of FIG. 1. As shown in FIG. 3, the menu "edit" includes menus such as "undo a drawing execution", "undo a whole drawing", "delete an image", "delete all image", "copy a selected region", "paste", etc.

Figure 4:
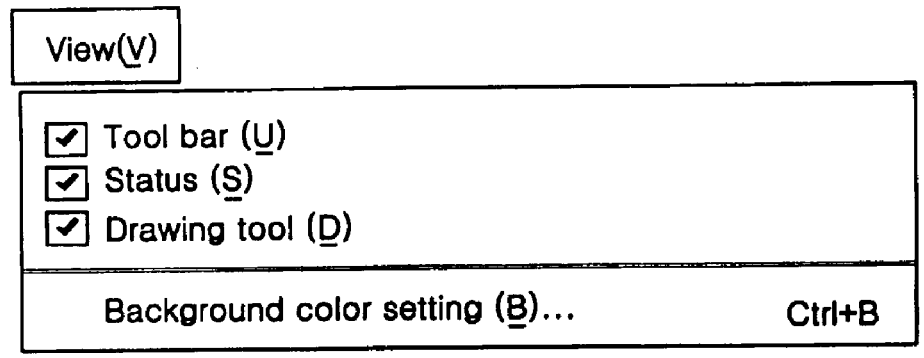
FIG. 4 shows a configuration of a menu "view" of the menu bar of FIG. 1.

FIG. 4 shows a configuration of the menu "view" of the menu bar of FIG. 1. As shown in FIG. 4, the menu "view" includes menus such as "tool bar", "status bar", "drawing tool", "background color setting", etc.

Figure 5:
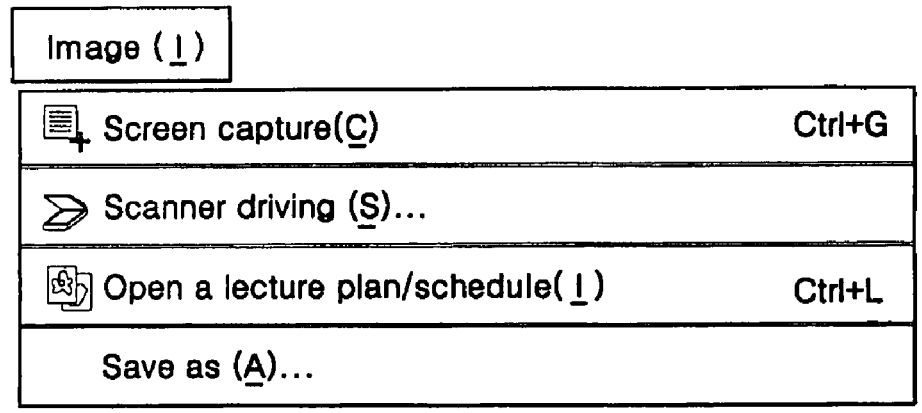
FIG. 5 shows a configuration of a menu "image" of the menu bar of FIG. 1.

FIG. 5 shows a configuration of the menu "image" of the menu bar of FIG. 1. As shown in FIG. 4, the menu "image" includes menus such as "screen capture", "scanner driving", "open an image", "save as", etc. The menu "screen capture" is one that starts a screen capture program that can capture any program or any screen in the computer. An image can be made using such a screen capture function. The menu "scanner driving" is one that drives a scanner to make an image and provides an automatic scanning function for automatically scanning, for example, an image, even though a user cannot know a usage of a scanner. The menu "open a lecture plan/schedule" provides a function that can use various kinds of graphic images as a lecture plan/schedule.

Figure 6:
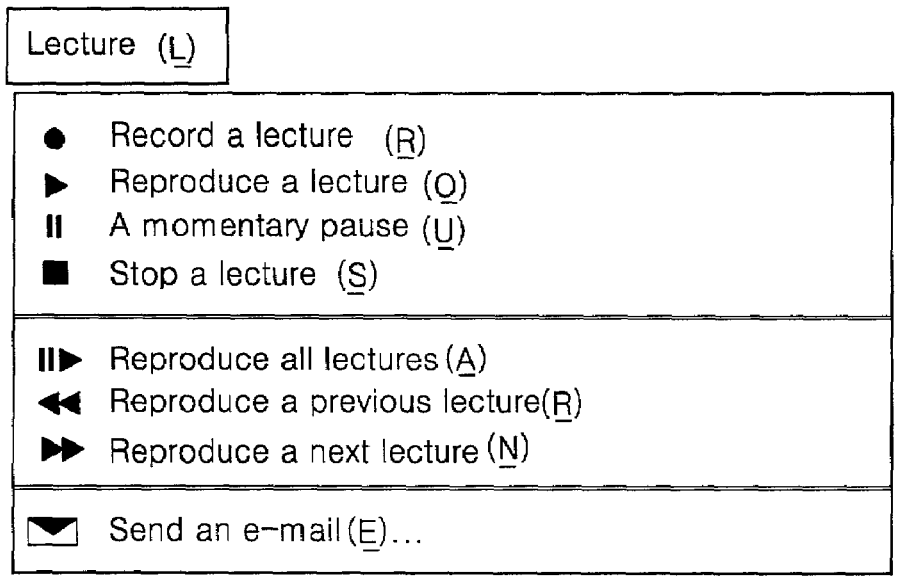
FIG. 6 shows a configuration of a menu "lecture" of the menu bar of FIG. 1.

FIG. 6 shows a configuration of the menu "lecture" of the menu bar of FIG. 1. As shown in FIG. 6, the menu "lecture" includes menus such as "record a lecture", "reproduce a lecture", "a momentary pause", "stop a lecture", "reproduce all lectures", "reproduce a previous lecture", "reproduce a next lecture", "send an e-mail", etc. The menu "send an e-mail" provides a function that transmits a file that is now opened using an e-mail function.

Figure 7:
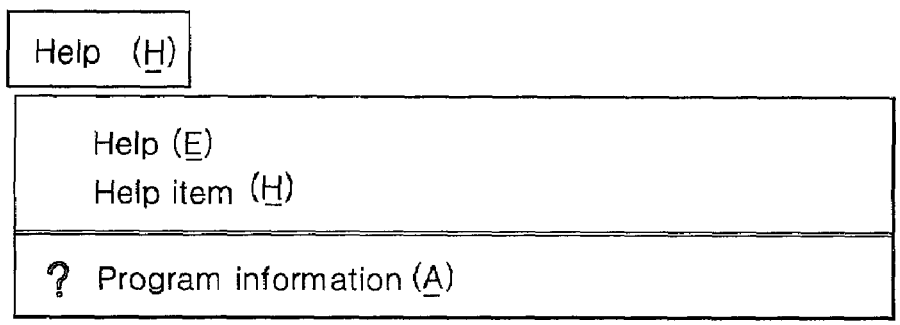
FIG. 7 shows a configuration of a menu "help" of the menu bar of FIG. 1.

FIG. 7 shows a configuration of the menu "help" of the menu bar of FIG. 1. As shown in FIG. 7, the menu "help" includes menus such as "help", "help item", "program information", etc.

Returning to FIG. 1, the basic tool bar includes file-related tools 10 and lectured-related tools 20. The file-related tools 10 includes tools such as "new lecture file", "open a lecture file", "save a lecture file", "print", "screen capture", "drive a scanner", "open a lecture plan/schedule", "send an e-mail", etc. The lectured-related tools 20 includes tools such as "record a lecture", "reproduce a lecture", "stop a lecture", "pause a lecture", "reproduce all lectures", "reproduce a previous lecture", "reproduce a next lecture", "pen thickness set", "highlight pen", "red pen", "green pen", "blue pen", "black pen", "white pen", "eraser".

The drawing tool bar 4 includes tools such as "pen", "brush", "line", "letter input", "eraser", "region selection", "rectangular", "circle", "rectangular", "circle", "line thickness set box", "color selection box", etc.

The status bar 5 includes regions 30 to 90. The region 30 indicates an explanation as to what use respective menus and tools have. The region 30 also includes a processing state bar showing a processing state while "record a lecture file" or "open a lecture file" function is carried out, and a slider showing a present location of a lecture that is being reproduced while a lecture is reproduced. The region 40 indicates a present location of a mouse in coordinates and not indicated while a lecture is recorded or reproduced. The region 50 indicates a time period required to reproduce a lecture having a certain time period while a lecture is reproduced. The region 60 indicates a total time period of an already recorded lecture. The region 70 indicates a state of "Caps Lock". The region 80 indicates a state of "Num Lock". The region 90 indicates a state of "Scroll Lock".

When the lecture recording and reproducing program is executed, the initial screen of FIG. 1 is displayed. Then, a lecturer selects the menu "open a lecture file" of the menu bar or the tool "open a lecture file" of the tool bar to open a lecture file having lecture plan/schedule information. Thereafter, the tool "record" of the tool bar is selected to record a lecture content. The handwriting information written by the lecturer using a mouse, a pen mouse or the like is recorded along with a voice of a lecturer. The lecturer records a lecture using the tool bar of FIG. 1 during a recording. When a recording is completed, the lecturer selects the tool "stop" of the tool bar to stop a recording. The lecturer selects the menu "save" or "save as" of the menu bar to make a new lecture file.

FIG. 8 shows a structure of a lecture file stored by the lecture recording and reproducing method of the present invention. As shown in FIG. 8, the lecture file includes a header region, a handwriting information region, a drawing information region, a lecture plan/schedule information region, and a voice information region. The header region includes date and time information, version information, a recognizer, a comment, a start location of handwriting information, a size of handwriting information (data amount), a start location of drawing information (a line, letter, a figure, etc), a size of drawing information (data amount), a start location of lecture plan/schedule (an image, a clip art, a metafile, etc) information, a size of lecture plan/schedule information (data amount), a start location of voice information, a size of voice information (data amount), resolution information, and a reserved region.

The handwriting information stores actual handwriting information. The drawing information stores actual drawing information. The lecture plan/schedule information stores actual lecture plan/schedule information. The voice information region stores actual voice information.

FIG. 9 shows a structure of a stroke record of the handwriting information region of the lecture file according to an exemplary embodiment of the present invention. As shown in FIG. 9, a stroke record of the handwriting information region includes a total number, a pen thickness, a pen color, a starting time, an ending time, a tool (pen or eraser), background color information, a total point number, a reservation region, a next record pointer, and a previous record pointer.

The stroke record is information that is produced whenever a lecturer moves a mouse upward or downward. The total number stores the total stroke number. The pen thickness is pen thickness information of a stroke. The pen color is a pen color of a stroke. The starting time is a time when a stroke is produced. The ending time is a time when a stroke is finished and is consistent with a starting time of a next stroke. The tool represents which of a pen, a highlight pen and an eraser is used as a tool. The total point number is the total number of point information produced in the stroke. The next record pointer is a pointer that indicates a next stroke record in a double linked list. The previous record pointer is a pointer that indicates a previous stroke record in a doubled linked list.

Figure 10:
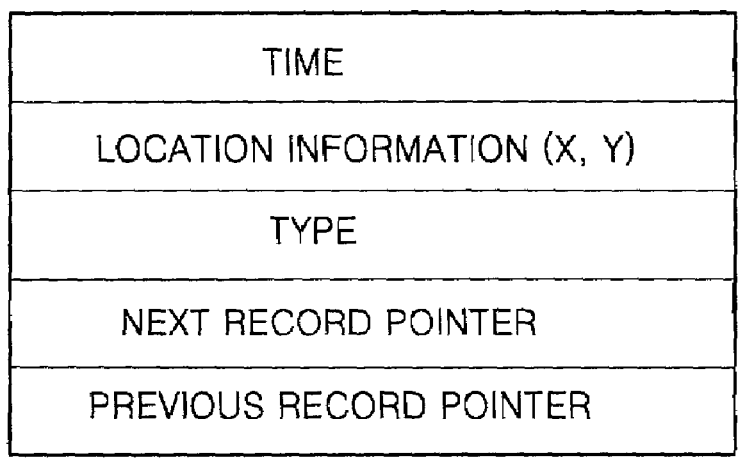
FIG. 10 shows a structure of a point record of the handwriting information region of the lecture file according to the preferred embodiment of the present invention.

FIG. 10 shows a structure of a point record of the handwriting information region of the lecture file according to an exemplary embodiment of the present invention. As shown in FIG. 10, the point record of the handwriting information region includes a time, location information (X, Y), a type, a next record pointer, and a previous record pointer.

The point record is information that is generated according to a movement of a mouse after a stroke is produced. The time is a time required to produce the point record. The location information (X, Y) is location information of a mouse. The type is event information generated during a recording of a lecture and denotes a momentary pause, a scroll, pen information, etc. The next record pointer is a pointer that indicates a next record in a double linked list. The previous record pointer is a pointer that indicates a previous record in a double linked list.

One stroke record is produced in real-time according to an up or down event of a mouse or a pen mouse during a recording and at the same time, necessary information is set before it is managed as a linked stroke. In order to store location information according to a movement of a mouse or a stylus pen and time information after respective strokes are produced, one point record is produced in real-time, and at the same time, necessary information is produced and configured before it is managed as a double-linked stroke.

Figure 11:
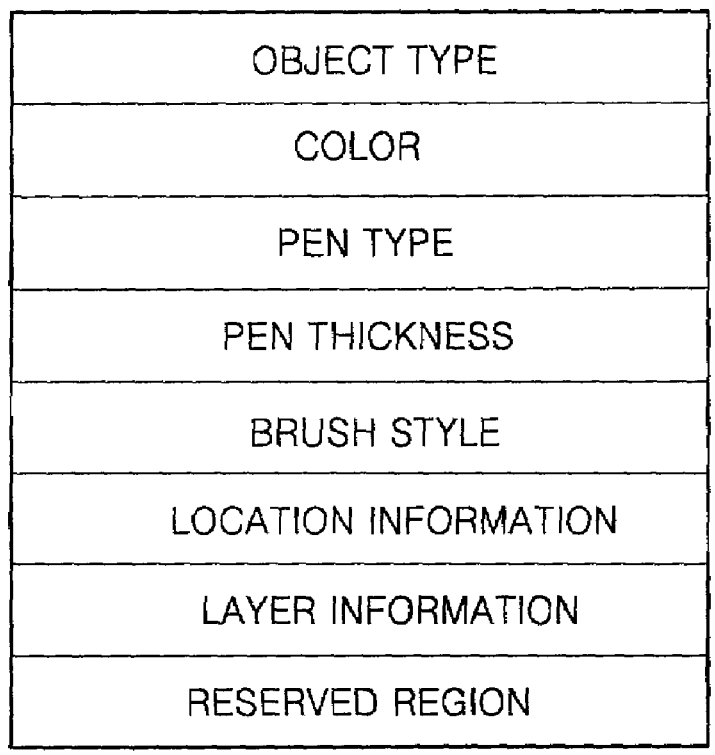
FIG. 11 shows a structure of a draw information region of the lecture file.

FIG. 11 shows a structure of the drawing information region of the lecture file. The drawing information region includes an object type, a color, a pen type, a pen thickness, a brush style, location information, layer information, and a reserved region.

The object type represents a type of a circle, a rectangle, or the like. The color is a color of an object. The pen type is a type of a pen used to draw an object. The pen thickness is a thickness of a pen used to draw an object. The brush style is a brush style used to draw an object. The location information is location information required to draw an object. The layer information is order information in which an object is produced and is information that is required for a function undoing a drawing.

FIG. 12 shows a structure of a free line object portion of the drawing information region of the lecture file. The free line object portion of the drawing information region includes region information, an object identification (ID), a color, a previous color, a thickness, a total point number, layer information, and a pointer.

The region information includes both a starting point of and an ending point of the free line. The color is a color used to draw an object. The previous color is previous color information used to undo an object. The thickness is a pen thickness of the free line. The total point number is the number of all points. The layer information is order information in which objects are produced and is information required for a function undoing a drawing. The pointer is one for a first pointer structure.

Figure 13:
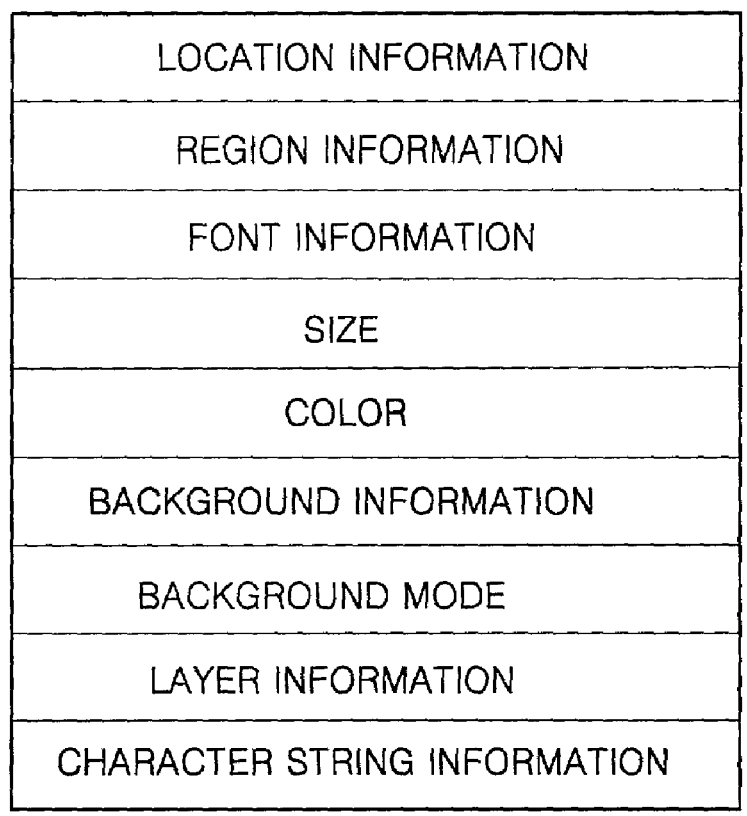
FIG. 13 shows a configuration of an OLE Text Box object portion of the draw information region of the lecture file.

FIG. 13 shows a structure of a letter object portion of the drawing information region of the lecture file. The letter object portion of the drawing information includes location information, region information, font information, a size, a color, background information, a background mode, layer information, and character string information.

The location information is location information, which a character string is displayed on a screen and is information for an undo function. The font information is font information used to display a character string. The size is a size of a letter. The color is a color of a character string. The background color is a background color of a character string. The background mode represents which of a transparent character string and an opaque character string is displayed. The layer information is order information in which objects are produced and is information that is required for a function undoing a drawing. The character string information includes letter information to be actually displayed.

The drawing information is information that is not reproduced in real-time and stores information made before a recording begins or an information made in a state of a momentary pause during a recording. Therefore, drawing information cannot be added or deleted during a recording.

FIG. 14 shows the image information of the lecture file. The image information includes location information, an actual size of lecture plan/schedule information, a size of a lecture file, location information in the lecture file, lecture plan/schedule information, a file size of the lecture plan/schedule, a starting time, an ending time, and a reserved region.

The location information is location information, which a lecture plan/schedule is displayed on a screen. The size of the actual lecture plan/schedule is actual size information of the lecture plan/schedule. The size of the lecture plan/schedule is a changed size of the image when a size of the lecture plan/schedule is changed. The type is a type of the lecture plan/schedule. That is, the type is information to identify an image type such as JPEG, BMP, GIF, DIB, TIF, etc., a metafile, a clip art, etc. Since the location information uses one or more lecture plans/schedules, a starting location in the lecture file for respective lecture files is indicated when the location information is stored in the file. The lecture plan/schedule information is lecture plan/schedule information to be actually displayed. The size of the lecture plan/schedule is size information of the lecture plan/schedule file. The starting time is a time as to when the present lecture plan/schedule is displayed on a screen. The ending time is a time as when the present lecture plan/schedule is deleted.

The lecture plan/schedule information stores information made before a recording is carried out or information in a state of a momentary pause during a recording. Therefore, the lecture plan/schedule information cannot be added or deleted during a recording.

The voice information does not have a specific structure because it is stored in real-time, and stores and reproduces a voice using a voice compression/reproduction codec.

Hereinafter, a method of recording and reproducing a lecture by the lecture recording and reproducing program of the present invention is explained in detail with references to FIGS. 15 and 16.

Before recording or reproducing a lecture using a computer, the lecture recording and reproducing program is first executed, so that the initial screen window of FIG. 1 is displayed. A microphone for a voice input is connected to a microphone input terminal of a sound card embodied in the computer, and a mouse, a pen mouse or the like is connected for a signal input.

FIG. 15 is a flow chart illustrating a method of recording a lecture according to an exemplary embodiment of the present invention. The lecture recording and reproducing program is executed, so that the initial screen window may be displayed on the computer screen as shown in FIG. 1 (step 100).

When a lecture file including pre-stored actual lecture plan/schedule information and its related information are opened, the actual handwriting information and its related information are stored in the memory of the computer (step 110). In this point, the handwriting information to be used includes information read by the scanner, captured information for contents on the screen and various graphic files.

An actual lecture plan/schedule is displayed on the screen by using the information relating to the actual lecture plan/schedule information stored in the memory of the computer (step 120). That is to say, the information is displayed on the screen using the related information stored in the memory of the computer in such a manner that the actual handwriting information is rearranged in the same configuration as that displayed on the screen.

Upon beginning the lecture, the actual lecture plan/schedule information, the actual drawing information, and their related information, which are inputted from the mouse, are stored in the memory of the computer. The actual lecture plan/schedule information, the actual handwriting information, and the actual drawing information are written together with a pen shape into the assigned area in the memory of the computer so as to be equal to the configuration displayed on the screen by using information relating to the lecture plan/schedule information, the handwriting information, and the drawing information (step 130). Here, voice information also is stored in the memory of the computer together with the actual handwriting information, the actual drawing information, and their related information. Further, time information relating to the actual handwriting information and the actual drawing information is also stored in the memory of the computer.

The information relating to the actual handwriting information and the actual drawing information is the stroke record produced according to the up or down event of a mouse (see FIG. 9) and the point record produce according to a movement of the mouse (see FIG. 10), which are stored in the stroke information region of the memory in the computer.

The information written to the assigned area in the memory of the computer is displayed on the screen (step 140). Namely, the information written to the assigned area in the memory of the computer is rewritten to the memory of the computer, and then displayed on the screen. Here, the information is displayed on the screen and simultaneously a voice signal is outputted through a speaker.

It is judged whether a stop function is selected or not (step 150). If the recording is completed, the operation is terminated using the stop function of the menu bar or the tool bar in the window. If the recording needs to be continued, proceed to the step 130.

Thus, the lecture recording method according to the present invention includes writing the actual lecture plan/schedule information, the actual handwriting information, the actual drawing information to the assigned area in the memory of the computer so as to be equal to the configuration displayed on the screen by using the actual lecture plan/schedule, the actual handwriting information, and the actual drawing information and their related information, and then displaying the information stored to the assigned area in the memory of the computer is displayed on the screen after being stored in the memory of the computer.

FIG. 16 is a flow chart illustrating a method of reproducing a lecture according to an exemplary embodiment of the present invention. The lecture recording and reproducing program or a suitable program for use solely in reproduction of a lecture file (not shown) is executed, so that the initial screen window of FIG. 1 is displayed (step 200).

When a lecture file including the pre-stored actual lecture plan/schedule information, the actual handwriting information, the actual drawing information, and their related information is opened, the actual lecture plan/schedule information, the actual handwriting information, the actual drawing information, and their related information will be stored in the memory of the computer (step 210).

The information relating to the actual lecture plan/schedule information stored in the memory of the computer is displayed on the screen (step 220). That is to say, the lecture plan/schedule information is displayed on the screen using the actual lecture plan/schedule information stored in the memory of the computer in such a manner that the actual lecture plan/schedule information is rearranged in the same configuration as that displayed on the screen.

The actual lecture plan/schedule information, the actual handwriting information, and the actual drawing information is written to the assigned area in the memory of the computer together with a pen shape, so as to be equal to the configuration displayed on the screen by using information relating to the actual lectual plan/schedule information, the actual handwriting information, and the actual drawing information (step 230).

The information written to the assigned area in the memory of the computer is displayed on the screen (step 240). Namely, the information written to the assigned area in the memory of the computer is rewritten to the memory of the computer, and then displayed on the screen. Here, the information is displayed on the screen and simultaneously a voice signal is outputted through a speaker. Further, voice information is stored in the memory of the computer at the same time.

It is judged whether a stop function is selected or not (step 240). If the stop function is selected, the reproduction is terminated. If the stop function is not selected proceed to the step 230.

Namely, when the menu or the tool "reproduce" is selected, a system timer is set, and then the actual handwriting information, the actual drawing information, and the voice information are all sequentially reproduced by using the time information relating to the actual handwriting information, the actual drawing information, and the voice information stored in the memory of the computer according to the system timer.

Therefore, with the lecture reproducing method according to the present invention, since all information in the lecture file are written in the memory so as to be equal to the configuration displayed on the screen and are rewritten in the memory of the computer, and then displayed on the window even during a reproduction, a flicker can be overcome. While the invention has been particularly shown and described with reference to preferred embodiments thereof, it will be understood by those skilled in the art that the foregoing and other changes in form and details may be made therein without departing from the spirit and scope of the invention.

Thus, with use of the computer-based lecture recording and reproducing method according to the preferred embodiment of the present invention, the whole information of the lecture file is first written in the memory with the same configuration as that displayed on the screen, and then in the memory of the computer again, and finally displayed on the screen, so that it is possible to eliminate a flicker during recording and reproducing.

Further, the computer-based lecture recording and reproducing method according to the preferred to embodiment of the present invention can reproduce a lecture file in real-time, by storing the time information relating to the handwriting information and the drawing information when recording and using the time information relating to the handwriting information and the drawing information stored in the lecture file when reproducing.

While the invention has been particularly shown and described with reference to exemplary embodiments thereof, it will be understood by those skilled in the art that the foregoing and other changes in form and details may be made therein without departing from the spirit and scope of the invention.

What is claimed is:

1. A computer-based lecture recording and reproducing method using a computer, in which the computer includes an information inputting unit for inputting handwriting information during a lecture, a voice inputting unit for inputting voice information during the lecture, a voice outputting unit for outputting the reproduced voice information, and a lecture recording and reproducing program for recording information inputted from the information inputting unit and the voice inputting unit and for reproducing the recorded information, the method comprising:

executing the lecture recording and reproducing program to display a window on a screen;

recording the lecture, including:

storing information inputted from the information inputting unit and information relating to the information inputted from the information inputting unit in a memory of the computer together with time information and storing voice information inputted from the voice inputting unit in the memory of the computer;

writing pre-stored information in a lecture file and the information inputted from the information inputting unit on an assigned area in the memory of the computer together with a shape of graphic tool by using the pre-stored information relating to the lecture file in the memory of the computer and the information relating to the information inputted from the information inputting unit so as to be equal to a configuration displayed on the screen; and displaying information written on the assigned area in the memory of the computer on the window of the screen; and reproducing the recorded lecture, including:
   storing information of the lecture file and the related information in the memory of the computer;
   writing sequentially the information of the lecture file on the assigned area in the memory of the computer together with the shape of graphic tool by using the related information; and
   displaying the information written on the assigned area in the memory of the computer on the window of the screen and outputting the voice information through the voice outputting unit,
   wherein the information of the lecture file includes lecture plan/schedule information, handwriting information and drawing information; and
   wherein a region of the lecture plan/schedule information stores a location for the lecture plan/schedule to be displayed, an actual size of the lecture plan/schedule, a type of the lecture plan/schedule, start location information of each image in the lecture file when at least one lecture plan/schedule is used, the lecture plan/schedule information, size information of the lecture plan/schedule file, a start time for the lecture plan/schedule to be displayed, a time when the lecture plan/schedule is deleted.

2. The method of claim 1, wherein the graphic tool is displayed in a pen shape when the handwriting information is inputted, and is displayed in an eraser shape when the inputted handwriting information is removed.

3. The method of claim 1, wherein the information of the lecture file is lecture plan/schedule information presented for the lecture in advance.

4. The method of claim 3, wherein the lecture plan/schedule information includes information captured from the screen.

5. The method of claim 4, wherein the lecture plan/schedule information includes a graphic image file.

6. The method of claim 1, wherein the drawing information and the lecture plan/schedule information are stored before the recording or when the recording is momentarily paused.

7. The method of claim 1, wherein the lecture recording and reproducing program sets a system timer and reproduces information of the lecture file using the time information according to the system timer when the recorded lecture is reproduced.

8. A computer-based lecture recording and reproducing method using a computer, in which the computer includes an information inputting unit for inputting handwriting information during a lecture, a voice inputting unit for inputting voice information during the lecture, a voice outputting unit for outputting the reproduced voice information, and a lecture recording and reproducing program for recording information inputted from the information inputting unit and the voice inputting unit and for reproducing the recorded information the method comprising:
   executing the lecture recording and reproducing program to display a window on a screen;
   recording the lecture, including:
      storing information inputted from the information inputting unit and information relating to the information inputted from the information inputting unit in a memory of the computer together with time information and storing voice information inputted from the voice inputting unit in the memory of the computer;
      writing pre-stored information in a lecture file and the information inputted from the information inputting unit on an assigned area in the memory of the computer together with a shape of graphic tool by using the pre-stored information relating to the lecture file in the memory of the computer and the information relating to the information inputted from the information inputting unit so as to be equal to a configuration displayed on the screen; and
      displaying information written on the assigned area in the memory of the computer on the window of the screen; and
   reproducing the recorded lecture, including:
      storing information of the lecture file and the related information in the memory of the computer;
      writing sequentially the information of the lecture file on the assigned area in the memory of the computer together with the shape of graphic tool by using the related information; and
      displaying the information written on the assigned area in the memory of the computer on the window of the screen and outputting the voice information through the voice outputting unit,
   wherein the information of the lecture file includes lecture plan/schedule information, handwriting information and drawing information; and
   wherein the information relating to the information of the lecture file includes date and time information, version information, a recognizer, a comment, a start location of the handwriting information, a size of the handwriting information, a start location of the drawing information, a size of the drawing information, a start location of the lecture plan/schedule information, a size of the lecture plan/schedule information, a start location of voice information, a size of the voice information, resolution information, information relating to the lecture plan/schedule information, information relating to the handwriting information, and information relating to the drawing information.

9. A computer-based lecture recording and reproducing method using a computer, in which the computer includes an information inputting unit for inputting handwriting information during a lecture, a voice inputting unit for inputting voice information during the lecture, a voice outputting unit for outputting the reproduced voice information, and a lecture recording and reproducing program for recording information inputted from the information inputting unit and the voice inputting unit and for reproducing the recorded information, the method comprising:
   executing the lecture recording and reproducing program to display a window on a screen;
   recording the lecture, including:
      storing information inputted from the information inputting unit and information relating to the information inputted from the information inputting unit in a memory of the computer together with time information and storing voice information inputted from the voice inputting unit in the memory of the computer;
      writing pre-stored information in a lecture file and the information inputted from the information inputting unit on an assigned area in the memory of the computer together with a shape of graphic tool by using the pre-stored information relating to the lecture file in the memory of the computer and the information relating to the information inputted from the information inputting unit so as to be equal to a configuration displayed on the screen; and displaying information written on the assigned area in the memory of the computer on the window of the screen; and reproducing the recorded lecture, including:

storing information of the lecture file and the related information in the memory of the computer;

writing sequentially the information of the lecture file on the assigned area in the memory of the computer together with the shape of graphic tool by using the related information; and displaying the information written on the assigned area in the memory of the computer on the window of the screen and outputting the voice information through the voice outputting unit, wherein the information of the lecture file includes lecture plan/schedule information, handwriting information and drawing information; and wherein the information relating to the handwriting information includes a stroke record and a point record, the stroke record including a total number of strokes, a pen thickness, a pen color, a start time of each stroke, an end time of each stroke, a kind of tool, background color information, a total number of points produced in the strokes, and point information indicating a previous stoke and a next stroke, the point record including a time when a point is produced, point location information, event information generated during the lecture recording, and point information indicating a previous point and a next point.

10. The method of claim 9, wherein the stroke record is produced whenever an up or a down event occurs by the information inputting unit.

11. The method of claim 9, wherein the point record stores location information and time information according to the movement of the information inputting unit after the stroke record is generated.

12. A computer-based lecture recording and reproducing method using a computer, in which the computer includes an information inputting unit for inputting handwriting information during a lecture, a voice inputting unit for inputting voice information during the lecture, a voice outputting unit for outputting the reproduced voice information, and a lecture recording and reproducing program for recording information inputted from the information inputting unit and the voice inputting unit and for reproducing the recorded information, the method comprising:

executing the lecture recording and reproducing program to display a window on a screen;

recording the lecture, including:

storing information inputted from the information inputting unit and information relating to the information inputted from the information inputting unit in a memory of the computer together with time information and storing voice information inputted from the voice inputting unit in the memory of the computer;

writing pre-stored information in a lecture file and the information inputted from the information inputting unit on an assigned area in the memory of the computer together with a shape of graphic tool by using the pre-stored information relating to the lecture file in the memory of the computer and the information relating to the information inputted from the information inputting unit so as to be equal to a configuration displayed on the screen; and displaying information written on the assigned area in the memory of the computer on the window of the screen; and reproducing the recorded lecture, including:

storing information of the lecture file and the related information in the memory of the computer;

writing sequentially the information of the lecture file on the assigned area in the memory of the computer together with the shape of graphic tool by using the related information; and displaying the information written on the assigned area in the memory of the computer on the window of the screen and outputting the voice information through the voice outputting unit, wherein the information of the lecture file includes lecture plan/schedule information, handwriting information and drawing information; and wherein the information relating to the drawing information includes a type of a drawing object, a color of the object, a type of a pen, a thickness of the pen, a brush style, location information and layer information, a free line object of the drawing object including region information having a start point and an end point of the free line, an object ID, a color used when the object is drawn, a color before the object is drawn, a pen thickness of the free line, a total number of points, layer information and location information on a first point, a letter object of the drawing object including location information on a character string to be displayed, region information, font information, a size, a color, a background color, a background mode, layer information, character string information to be actually displayed.

* * * * *